F. J. GOSTLIN.
APPARATUS FOR CURING TIRE CASINGS.
APPLICATION FILED APR. 2, 1919.
1,378,172.
Patented May 17, 1921.
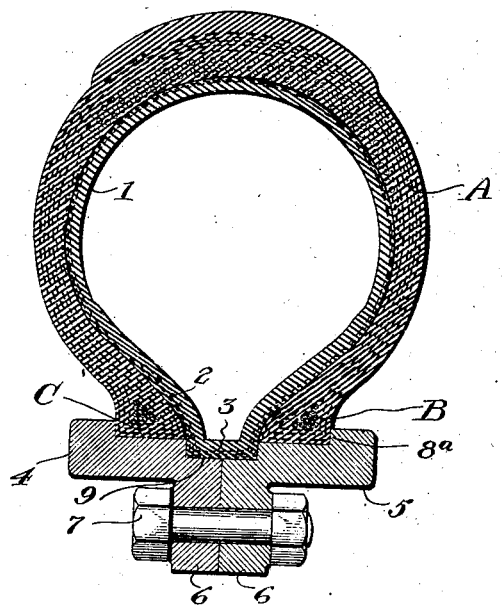
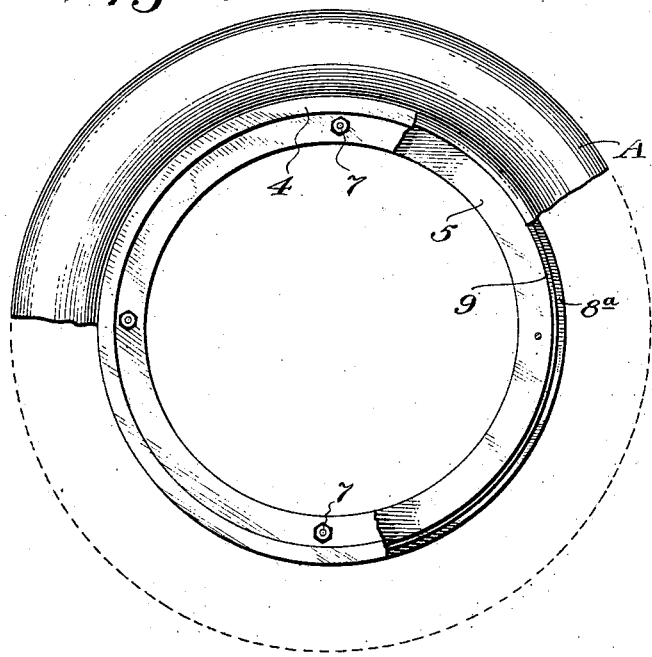
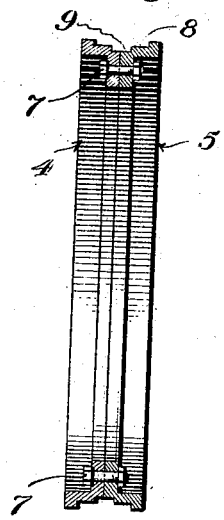
Inventor
Frederick J. Gostlin,
By J. Hanson Boyden,
Attorney

UNITED STATES PATENT OFFICE.

FREDERICK J. GOSTLIN, OF AKRON, OHIO, ASSIGNOR, BY DIRECT AND MESNE ASSIGNMENTS, TO THE STAR RUBBER COMPANY, OF AKRON, OHIO, A CORPORATION OF OHIO.

APPARATUS FOR CURING TIRE-CASINGS.

1,378,172. Specification of Letters Patent. Patented May 17, 1921.

Application filed April 2, 1919. Serial No. 286,920.

*To all whom it may concern:*

Be it known that I, FREDERICK J. GOSTLIN, a citizen of the United States, residing at Akron, in the county of Summit and State of Ohio, have invented certain new and useful Improvements in Apparatus for Curing Tire-Casings, of which the following is a specification.

This invention relates to molding or curing apparatus for pneumatic tire casings, and more particularly for cord tire casings.

In the manufacture of cord tire casings, the usual method is to build or form the casing around a suitable core, then remove the core, and insert an inflatable "air bag." The casing and air bag are then placed on a base ring comprising a pair of complementary sections and having annular shoulders to hold the casing in place, and the bag inflated so as to round out the casing and maintain it under proper tension while being cured or vulcanized. In carrying out this method, it has been found in actual practice, however, that it is very difficult to properly center the air bag on the base ring, and it frequently happens that such bag slips to one side, thus causing one bead portion of the tire casing to be thicker or wider than the other.

It is the object of the present invention, therefore, to provide means whereby tire casings having bead portions of exactly the same width or thickness may always be produced, without chance of failure.

To this end the invention contemplates the use of a sectional base ring having a central annular groove adapted to receive the inner edge or toe portion of the air bag, whereby the air bag is accurately centered, and prevented from shifting to either side.

In order that the invention may be readily understood, reference is had to the accompanying drawing, forming part of this specification, and in which:

Figure 1 is a transverse section through my improved curing apparatus showing a tire casing in position thereon;

Fig. 2 is a side elevation of the same, parts being broken away; and

Fig. 3 is a transverse section on a reduced scale showing the base ring detached.

Referring to the drawings in detail, A represents the tire casing which in this instance is illustrated as a cord tire and B designates the usual reinforcing bead which is shown as formed of a plurality of strands of wire or the like. C designates the base or heel of the tire in which the reinforcing bead is embedded.

The tire casing A is first constructed by being built around a suitable rigid form. This form is then removed and an air bag, designated by the reference numeral 1 inserted in the casing. This air bag is quite similar to an ordinary inner tube except that it is somewhat stronger, preferably containing fabric reinforcement as indicated at 2. The inner edge 3 of the air bag projects beyond the plane of the base C of the tire casing as clearly shown in Fig. 1.

The casing assembled upon the air bag is then placed in position on my improved sectional base ring. This ring comprises complementary halves or sections 4 and 5 and each ring section is provided with an inwardly projecting flange 6 by means of which the sections are secured together by the use of bolts 7.

Each ring section is, as usual, provided with a flat or cylindrical portion 8 and with an outer annular flange or shoulder $8^a$, the portions 8 and $8^a$ constituting bead-forming surfaces, against which the base or heel of the tire casing rests. The novelty of the present invention, however, resides in the fact that the peripheral portions or corner edges of the ring sections are cut away adjacent their meeting faces to form a central, annular groove 9. This groove may be of any desired cross-section but is shown as rectangular.

When the casing and air bag are assembled on the ring as shown in Fig. 1 it will be seen that the toe or inner portion 3 of the air bag projects down into the groove 9 and that the air bag is thereby accurately centered with respect to the ring and prevented from shifting laterally. By virtue of this construction the distance between the air bag and the shoulder $8^a$ is the same on both sides, and as a result, the bead portions of the tire casing which are received between the flanges $8^a$ and the air bag must necessarily be of the same width.

It will be understood that after the tire casing has been assembled on the air bag and ring as shown it is inclosed in an annular mold, the air bag is inflated, and the whole apparatus placed in a suitable vulcanizing device, where the casing is cured.

I have found that with my improved construction there are no "seconds" resulting from one bead portion being wider than the other, and also that the air bag is prevented from wrinkling or puckering, with the result that a single air bag can be used for curing a much greater number of casings than heretofore, before it is necessary to discard the same.

What I claim is:—

1. Apparatus for curing tire casings comprising a base ring split on a median plane to form a pair of complementary sections, the peripheral portion of said sections adjacent their meeting faces being cut away to form a central annular groove, means for confining the bead portions of a tire casing on said base ring, and a closed air bag lying within the casing, and having an inner toe portion snugly fitting in said groove and held in position thereby, whereby said bead portions of the casing are properly and symmetrically spaced.

2. A tire bead-forming ring having its inner corner edge cut away.

3. A tire bead-forming ring having its inner corner edge recessed.

4. A tire bead-forming ring having its inner corner edge cut away by a groove.

5. A pair of bead-forming rings having peripheral bead-forming surfaces and providing between said surfaces a groove or recess to receive a flexible form.

6. A pair of bead-forming rings having peripheral bead-forming surfaces and providing between said surfaces a groove or recess to receive a flexible form, and means for clamping said rings together.

In testimony whereof I affix my signature

FREDERICK J. GOSTLIN.